United States Patent [19]

Tanzer et al.

[11] Patent Number: 5,408,209
[45] Date of Patent: Apr. 18, 1995

[54] COOLED SECONDARY COILS OF ELECTRIC AUTOMOBILE CHARGING TRANSFORMER

[75] Inventors: Herbert J. Tanzer, Topanga; William Quon, Alhambra; Sergio Ramos, Wilmington, all of Calif.

[73] Assignee: Hughes Aircraft Company, Los Angeles, Calif.

[21] Appl. No.: 146,689

[22] Filed: Nov. 2, 1993

[51] Int. Cl.⁶ .............................. H01F 27/08
[52] U.S. Cl. .......................... 336/60; 320/2; 336/83; 336/DIG. 2; 336/61
[58] Field of Search ............... 336/60, 61, 83, 179, 336/183, DIG. 2; 320/2, 21

[56] References Cited

U.S. PATENT DOCUMENTS

| | | | |
|---|---|---|---|
| 4,105,984 | 8/1978 | Smith et al. | 336/60 |
| 4,529,955 | 7/1985 | Schuster et al. | 335/300 |
| 4,584,551 | 4/1986 | Burgher et al. | 336/61 |
| 4,588,972 | 5/1986 | Harumoto et al. | 336/58 |

Primary Examiner—Leo P. Picard
Assistant Examiner—L. Thomas
Attorney, Agent, or Firm—L. A. Alkov; W. K. Denson-Low

[57] ABSTRACT

A transformer is used to charge the battery of an electric automobile. The primary of the transformer is connected to a fixed power supply and is separable from a secondary mounted in the automobile. The secondary is cooled by cooling structure mounted on the secondary, particularly a heat pipe.

5 Claims, 3 Drawing Sheets

COOLED SECONDARY COILS OF ELECTRIC AUTOMOBILE CHARGING TRANSFORMER

FIELD OF THE INVENTION

The electric automobile battery is charged from an external source through a magnetic coupling comprising a transformer. The transformer secondary inductive charge receptacle is on the automobile. Cooling of the secondary receptacle is achieved by a heat pipe lying adjacent to the secondary and radiating away from the secondary.

BACKGROUND OF THE INVENTION

In order to reduce air pollution, there is a modern trend toward electrically powered automobiles. These electrically powered automobiles have rechargeable batteries therein. The power of the batteries is used to propel the automobile and to provide for other power needs thereof. The design of such a vehicle is a careful balance between payload, performance, range between charging, acceleration, and speed. No matter what the combination of these criteria, there is need to recharge the batteries periodically so that the automobile may be taken on another excursion. With fairly large battery capacity, there is need to recharge at a substantial amount of power. Since the time when an automobile is unavailable should be minimized, high charging rates are desirable. If an ordinary plug is to be used, the plug must be suited for high power, which brings about a risk of harm to the operator and/or other people in the vicinity from contact with parts of the electrical supply system.

It is, thus, desirable to make a coupling between the charging station and the automobile which does not require the direct transfer of electricity. A magnetic coupling is desirable. In accordance with this invention, an inductive charge coupler can be manually handled and inserted in an appropriate inductive charge receptacle slot in the automobile. The probe inductive charge coupler contains a transformer primary and contains an appropriate magnetic conductor. The inductive charge receptacle on the automobile contains the secondary winding(s) together with the rest of the magnetic core. The transformer secondary receptacle in the automobile is connected through appropriate electrical equipment to the battery for the charging thereof.

The frequency is preferably much higher than the ordinary power line frequency, and high charge rates are above 10 kilowatts. The result is that there are losses in the coupling system that result in heat. The amount of heat dissipated from the transformer coils, magnetic coils and other electronics contained within the inductively coupled connector transformer container can exceed 50 watts. It is desirable to cool the entire inductive charge transformer so that its internal temperatures do not exceed the operating range of the materials used in the connector housing.

SUMMARY OF THE INVENTION

In order to aid in the understanding of this invention, it can be stated in essentially summary form that it is directed to cooling of the secondary winding in the inductive charge receptacle of an electric automobile charging transformer by placing a portion of a heat pipe adjacent the secondary winding and removing the heat from the vicinity of the secondary winding by means of heat pipe action.

It is, thus, a purpose and advantage of this invention to provide a system for automobile battery charging which includes a transformer having a separable and cooled primary inductive charge coupler so that the primary may be energized from a stationary source and inserted into the transformer inductive charge receptacle to energize the magnetic circuit therein and the electrical secondary circuit therein.

It is another purpose and advantage of this invention to provide a cooled inductive charge receptacle secondary of an electric automobile charging transformer by placing a heat pipe adjacent the secondary winding in order to remove the heat away from the vicinity of the secondary winding.

It is a further purpose and advantage of this invention to provide a high-performance inductive charge coupling transformer which transfers a large amount of energy so that magnetic coupling from a power source to an automobile can be accomplished without the need for a direct contact electric plug-in to achieve safety to persons involved in the charging process.

It is a further purpose and advantage of this invention to provide a high-performance inductive charge coupler transformer which is capable of transferring a substantial amount of energy with the transformer, and particularly the secondary winding structure thereof, to be of minimum weight to maximize automobile performance.

It is a further purpose and advantage of this invention to provide a separable automobile battery charging transformer, a portion of which remains on the automobile and a portion of which is separable therefrom so as to be permanently connected to a power supply. The portion permanently installed in the automobile is provided with cooling, which also acts to cool the separable portion.

Other purposes and advantages of this invention will become apparent from a study of the following portion of the specification, the claims and the attached drawings wherein:

DESCRIPTION OF THE PREFERRED EMBODIMENTS

Automobile 10 is an automotive vehicle configured for the transportation of a few people and a small amount of baggage. It carries batteries which power motors which are connected to the road wheels. Suitable electrical and mechanical controls are provided to control the speed and direction of the vehicle. The onboard battery must be recharged periodically. In the system in accordance with this invention, charging power comes from a fixed power source 12 which is located adjacent the position where the automobile 10 will be parked. In the present illustration, the automobile 10 is parked on its driveway 14 near the home of the owner of the automobile. A fixed power source 12 may also be located adjacent the parking position of the automobile when the owner is working or shopping.

Figure 1:
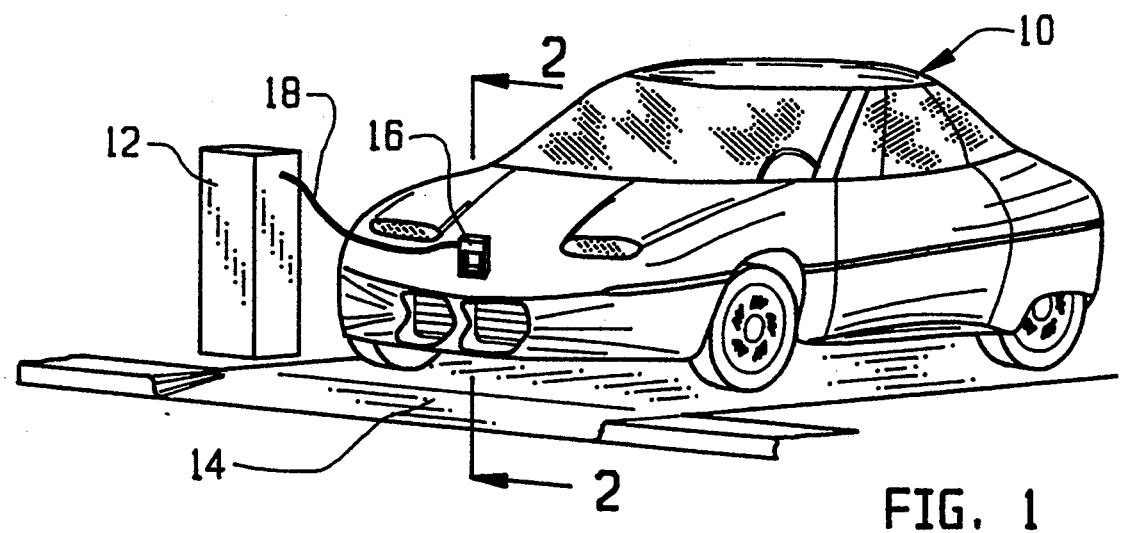
FIG. 1 is a perspective view of an electric automobile adjacent a charging station, in accordance with this invention.
Figure 2:
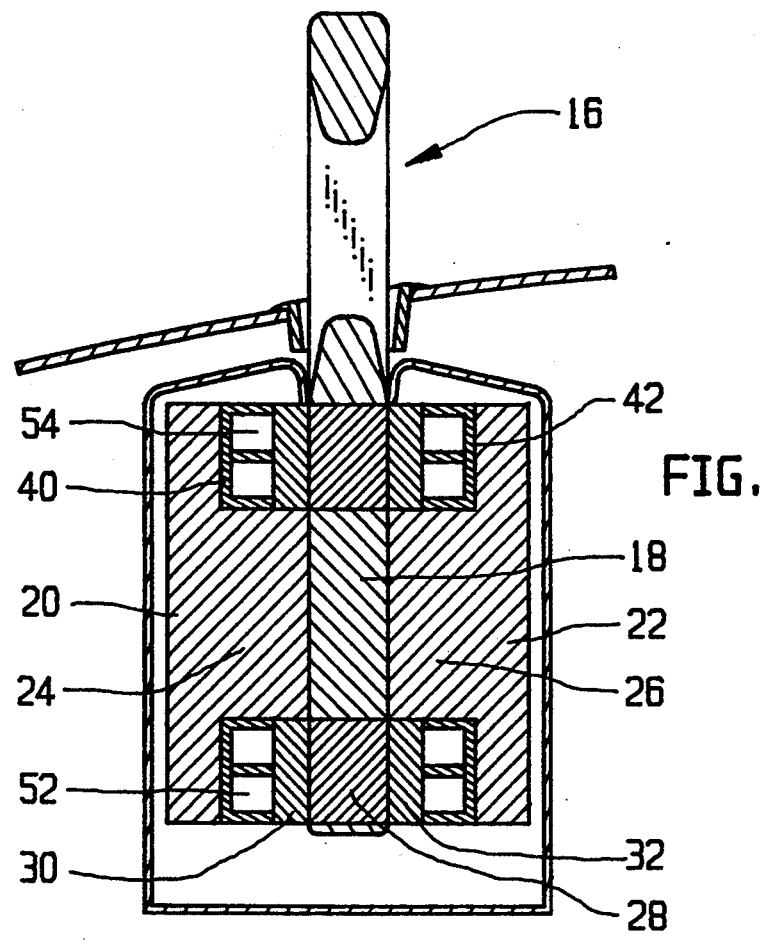
FIG. 2 is an enlarged section taken generally along line 2—2 of FIG. 1, with parts broken away.

It is presupposed by this invention that the automobile will not be directly powered from the power source 12 by means of a direct plug-in, but the charging connection will be inductive. A transformer is designed to receive power from the power source 12 and to deliver the power through magnetic coupling to a transformer secondary coil in the automobile. The secondary coil is appropriately connected to charge the automobile batteries. The power supply frequency is chosen in connection with the overall power supply parameters, including the transformer parameters. Inductive charge coupler 16, seen plugged into the inductive charge receptacle on automobile 10 in FIG. 1 and seen in enlarged sectional view in FIG. 2, is connected to the fixed power source by means of cable 18. The cable 18 incorporates the electrical cable, coolant tubes (if necessary), and control circuitry.

Figure 3:
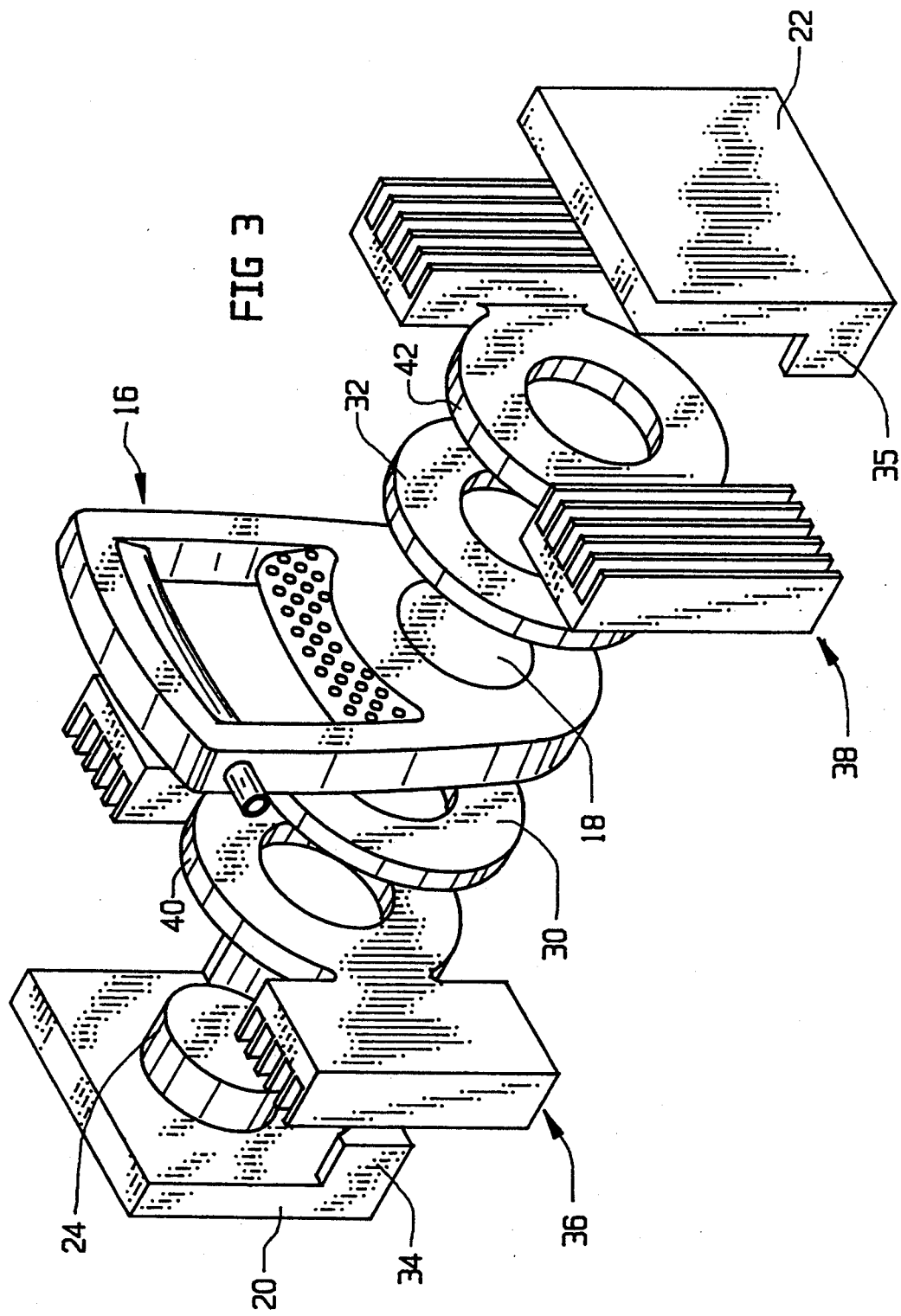
FIG. 3 is an exploded isometric view of the electric automobile charging transformer, showing the relationship of the parts.

Inductive charge coupler 16 has a magnetic core 18 which mates with secondary magnetic cores 20 and 22. The secondary cores have circular central plugs 24 and 26 which match the circular primary magnetic core 18. This is best seen in FIG. 3 where the central plug 24 is depicted. The primary winding 28, see FIG. 2, surrounds the primary core 18. The secondary windings 30 and 32 surround their respective plugs 24 and 26 and lie against the primary winding. The magnetic circuit is completed around the outside of these windings by means of fingers, such as fingers 34 and 35. When the secondary is assembled, these fingers lie in face-to-face contact. The primary and secondary coils also lie in face-to-face contact. The use of two secondary coils enhances efficiency.

In order to cool the transformer, and in particular the secondary coils, the extraction of heat is provided for. Heat pipes 36 and 38 are positioned directly within the transformer secondary. The heat pipes are the same, and heat pipe 36 is shown in more detail in FIG. 4, where its back cover is removed. Heat pipe 36 has annulus 40, and heat pipe 38 has annulus 42. As seen in FIG. 2, each annulus lies directly against one of the secondary windings 30 and 32 on the outside of the windings away from the secondary winding contact with the primary winding.

Figure 4:
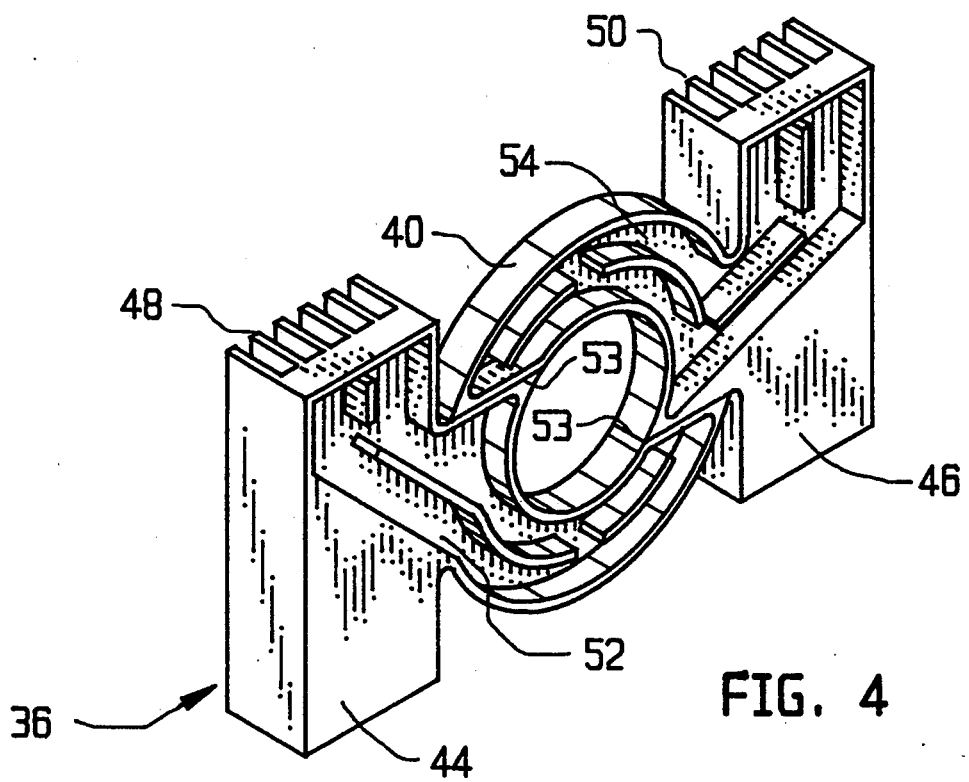
FIG. 4 is a view of the first embodiment of a heat pipe, with the rear cover removed.

FIG. 4 shows the heat pipe 36 with its rear cover removed. The heat pipe 38 is similar. Condensers 44 and 46 are formed as part of the heat pipe. The condensers 44 and 46, respectively, have fins 48 and 50 thereon. These fins are sets of fins for transferring the heat from the condenser to the ambient air. The annulus, condensers and fins are unitarily formed of a non-magnetic material having a high coefficient of thermal conduction; for example, aluminum. Heat pipe channels 52 and 54 are formed in the annulus and the condenser. The heat pipes are made in two halves, with the heat pipe 36 separable along lines 53 and 55 for assembly purposes. Each of the channels goes about half way around the annulus, and each terminates in its condenser structure. Each of the channels is supplied with heat pipe fluid which boils in the annulus and which condenses in the condenser under normal operating conditions. This transfers heat from the annulus to the condenser and, thence, to the surroundings. The condensed liquid flows back to the annulus gravitationally through the heat pipe channels, as is seen in FIG. 4. The annulus may be packed with wick material which distributes the heat pipe liquid through the annulus independent of gravity flow. When the wicking and heat pipe fluid are placed within the heat pipe channels, the rear cover is put in place and the structure appears as it does in FIG. 3, with the heat pipe channels hermetically closed. In this way, the heat is extracted from directly adjacent the secondary winding.

Figure 5:
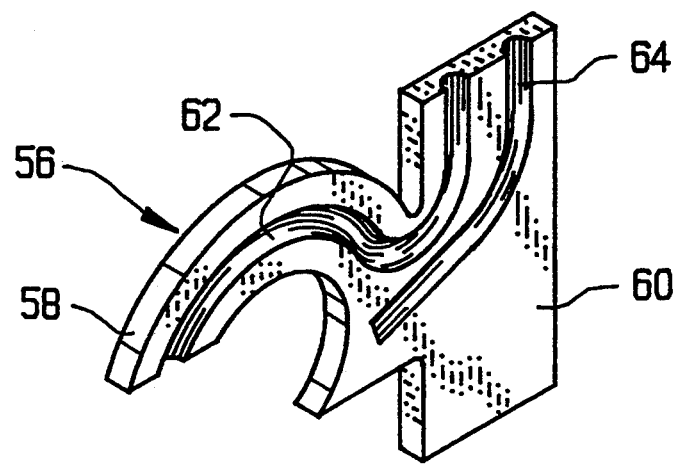
FIG. 5 is an isometric view of a second preferred embodiment of the heat pipe used for removing heat from the vicinity of the charging transformer secondary.

Heat pipe structure 56, shown in FIG. 5, is half of another preferred embodiment of heat pipe suitable for use in cooling the transformer secondary. The heat pipe structure 56 has a half annulus 58 together with an associated condenser panel 60. Grooves 62 and 64 are configured to extend from the condenser panel through at least a portion of the half annulus. Grooves 62 and 64 are also configured to receive a pre-manufactured heat pipe tube, which is made of malleable material and which is fully sealed. The heat pipe contains wick material and heat pipe fluid and can be installed at any convenient location for heat pipe function. In this case, such tubular pre-manufactured heat pipes are installed in the grooves 62 and 64. Two of the heat pipe structures 56 are employed together, each contributing half of the annulus, two pre-manufactured heat pipes and one condenser panel. A pair is installed around plug 24, and a pair is installed around plug 26. When the assembly is made, the section looks much like FIG. 2, but instead of square heat pipe channels, pre-manufactured heat pipe tubes are pressed against the secondary windings.

The use of heat pipes very efficiently transfers the heat generated within the transformer to the environment outside of the transformer. Because of the small cross-sectional heat transfer area, the electrical insulation on the secondary windings and the poor thermal conduction of the magnetic material, special heat removal provisions provided by the use of these heat pipes significantly improves transformer performance. Higher temperatures cause increased thermal resistance of the transformer windings, decreased magnetic core efficiency, together with temperature limits of the insulation material require limited power transfer or efficient heat removal, such as provided by this heat pipe structure.

In addition to permitting a higher power transfer in a unit of the same size, the cooling of the secondary also cools the primary winding in the probe 16. When the probe is removed at the end of charging, it must be sufficiently cool that it cannot harm the user. The cooling of the transformer secondary has the additional benefit of cooling the transformer primary to achieve this desirable safety result.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An automobile charging transformer comprising:
    a primary inductive charge coupler for attachment to a fixed power supply, said primary inductive charge coupler having a primary electric winding; and an inductive charge receptacle including a transformer secondary electric winding for mounting in the automobile to charge the battery of the electric automobile, a magnetic core for completing a magnetic circuit through said primary and secondary windings, wherein said inductive charge receptacle transformer has a slot therein to receive said inductive charge coupler and said secondary winding is divided into first and second secondary winding portions with said first and second secondary winding portions being positioned on opposite sides of said slot and a heat pipe for cooling said secondary winding is associated with both said first and second secondary widing portions, wherein said heat pipe has a portion adjacent each said secondary winding portion and a heat pipe portion remote from said secondary winding portion so that heat from said secondary winding is discharged remotely from said secondary winding, and further wherein said heat pipe comprises an annular body having heat pipe passages therein and condensers attached to said annular body and positioned away from said annular body, said heat pipe passages extending into said annular body and into said consenser.

2. The transformer of claim 1 wherein said means for cooling said secondary winding includes a fluid passage adjacent said secondary winding.

3. The transformer of claim 2 wherein a heat exchange fluid is in said fluid passage adjacent said secondary winding.

4. The transformer of claim 3 wherein said passage comprises a portion of a heat pipe, said heat pipe having an end remote from said secondary winding so that heat from said secondary winding is discharged remote from said secondary winding.

5. The transformer of claim 1 wherein there are two condensers attached to each said annular body and each said annular body has two heat pipe passages therein, one extending into each of said condensers.

* * * * *